(12) United States Patent
Mathivanan et al.

(10) Patent No.: US 11,982,131 B2
(45) Date of Patent: May 14, 2024

(54) SYSTEM AND METHOD TO AUTOMATICALLY POSITION A MACHINE IN AN OPERATING CONFIGURATION

(71) Applicant: Caterpillar Global Mining Equipment LLC, Denison, TX (US)

(72) Inventors: Saravanan S. Mathivanan, Chennai (IN); Sridhar Thondikulam Raveendran, Chennai (IN); Sudhagar Selvam, Chennai (IN)

(73) Assignee: Caterpillar Global Mining Equipment LLC, Denison, TX (US)

( * ) Notice: Subject to any disclaimer, the term of this patent is extended or adjusted under 35 U.S.C. 154(b) by 653 days.

(21) Appl. No.: 17/150,836

(22) Filed: Jan. 15, 2021

(65) Prior Publication Data
US 2021/0222498 A1   Jul. 22, 2021

(30) Foreign Application Priority Data
Jan. 16, 2020   (IN) .............................. 202011002030

(51) Int. Cl.
*G05B 15/00* (2006.01)
*E21B 15/04* (2006.01)

(52) U.S. Cl.
CPC ............ *E21B 15/045* (2013.01); *G05B 15/00* (2013.01); *G05B 2219/45059* (2013.01)

(58) Field of Classification Search
CPC ....................... G05B 15/00; G05B 2219/45059
See application file for complete search history.

(56) References Cited

U.S. PATENT DOCUMENTS

| 4,343,367 | A | | 8/1982 | Mashimo |
| 4,703,811 | A | * | 11/1987 | Lam .................... E02D 7/16 173/195 |
| 5,088,020 | A | | 2/1992 | Nishida et al. |
| 5,383,524 | A | | 1/1995 | Rinnemaa |
| 5,748,097 | A | | 5/1998 | Collins |
| 8,464,810 | B2 | | 6/2013 | Haverinen |
| 8,527,158 | B2 | | 9/2013 | Faivre et al. |
| 9,476,526 | B2 | | 10/2016 | Cody et al. |

(Continued)

FOREIGN PATENT DOCUMENTS

| JP | H07229385 A | 8/1995 |
| JP | 2004044375 | 2/2004 |

(Continued)

*Primary Examiner* — Kira Nguyen (57) ABSTRACT

A machine comprising a frame supported on a movable carrier. A first actuator is adapted to actuate a boom coupled to the frame. A first sensor generates signals indicative of a spatial orientation of the boom. At least one second actuator actuates a drilling work device coupled to the boom. A second sensor generates signals indicative of a spatial orientation of the drilling work device. A controller receives signals indicative of the spatial orientation of the boom and the drilling work device and actuates at least one of the first actuator and the second actuator through predetermined sequential steps to automatically position the machine in a default configuration. The controller further receives signals indicative of data corresponding to at least one drilling hole and automatically positions the machine in an operating configuration.

20 Claims, 8 Drawing Sheets

(56) References Cited

U.S. PATENT DOCUMENTS

| | | | |
|---|---|---|---|
| 2014/0110168 A1* | 4/2014 | Pursimo | E21B 7/025 |
| | | | 701/50 |
| 2016/0112678 A1* | 4/2016 | Suvanen | H04N 23/63 |
| | | | 175/24 |
| 2018/0187540 A1* | 7/2018 | Hanski | E21B 7/022 |
| 2018/0216459 A1* | 8/2018 | Heikkila | G01S 19/14 |
| 2020/0308914 A1* | 10/2020 | Haverinen | E21B 7/024 |

FOREIGN PATENT DOCUMENTS

| | | |
|---|---|---|
| JP | 2011514456 | 5/2011 |
| WO | 2019049248 | 3/2019 |

* cited by examiner

SYSTEM AND METHOD TO AUTOMATICALLY POSITION A MACHINE IN AN OPERATING CONFIGURATION

TECHNICAL FIELD

The present disclosure relates to a drilling machine. More particularly, the present disclosure relates to automating process of positioning the drilling machine in an operating configuration.

BACKGROUND

In drilling and other work sites, various drilling vehicles, i.e. mobile drilling machines, are used. The drilling vehicle is provided with a boom and a drilling work machine on the boom. The boom is moved during use between different working positions. Controlling the boom is typically a demanding and time-consuming task, because the boom structure is complex. The boom usually comprises multiple boom actuators and joints the setting of which to a desired position using manual controls is not always intuitive. Furthermore, visibility of the operator to a working site may be poor and available free space is limited.

Typically, at a drilling site using such drilling vehicles, there are more than one drilling locations. Each drilling location may include one or more holes. For positioning the drilling vehicle over such a hole, an operator needs to manually adjust multiple front-end implements. Positioning the drilling vehicle over one such hole may require substantial time and effort and can be quite a tedious process. Further, if the drilling vehicle is to be shifted to a new hole, process of setting up the machine relative to the new hole needs to be repeated once again, consuming substantial time and effort.

U.S. Pat. No. 9,476,256 (hereinafter called as the '256 reference) discloses a mining vehicle and a method of moving a boom of a mining vehicle. The boom is provided with several boom joints and there is a mining work device at a distal end of the boom. One or more boom joint positions are determined and stored in a memory medium. A control unit of the mining vehicle may automatically move the boom to a predetermined tramming position. Tramming position is defined as a configuration of the mining vehicle to efficiently travel between two mining locations. However, the '256 reference does not disclose about setting up the machine relative to a drilling location.

Thus, there is a need to provide a drilling vehicle which may be easily set up for drilling between various drilling locations.

SUMMARY

In an aspect of the present disclosure, a machine is provided. The machine includes a movable carrier and a frame supported on the movable carrier. The machine includes a boom coupled to the frame. The machine includes a first actuator which actuates the boom and a first sensor configured to generate signals indicative of a spatial orientation of the boom. The machine includes a drilling work device coupled at a distal portion of the boom. The machine includes one or more second actuators adapted to actuate the drilling work device. The machine includes one or more second sensors configured to generate signals indicative of a spatial orientation of the drilling work device. The machine includes a user input interface configured to generate signals indicative of data corresponding to one or more drilling holes. The machine further includes a controller communicably coupled to the first actuator, the first sensor, the second actuator and the second sensor. The controller receives the signals indicative of the spatial orientation of the boom. The controller receives the signals indicative of the spatial orientation of the drilling work device. The controller actuates the first actuator and the second actuator through predetermined sequential steps to automatically position the machine in a default configuration. The controller further receives the signals indicative of the data corresponding to the drilling hole and selectively actuates one or more of the first actuator and the second actuator based on the received signals indicative of the data corresponding to the drilling hole to automatically position the machine in an operating configuration from the default configuration.

In another aspect of the present disclosure, a method to operate a machine is provided. The machine has a boom and a drilling work device coupled to the boom. The method includes receiving signals indicative of a spatial orientation of the boom by a controller. The boom has a first actuator. The method includes receiving signals indicative of the spatial orientation of the drilling work device by the controller. The drilling work device has at least one second actuator. The method includes actuating one or more of the first actuator and the second actuator by the controller through predetermined sequential steps to automatically position the machine in a default configuration. The method includes receiving signals indicative of data corresponding to one or more drilling holes by the controller. The method includes selectively actuating one or more of the first actuator and the second actuator by the controller based on the received signals indicative of the data corresponding to the drilling hole to automatically position the machine in an operating configuration from the default configuration.

In yet another aspect of the present disclosure, a computer program is provided. The computer program includes program code means configured to control a machine to execute method steps. The machine has a boom and a drilling work device coupled to the boom. The method steps include receiving signals indicative of a spatial orientation of the boom. The boom has a first actuator. The method steps include receiving signals indicative of the spatial orientation of the drilling work device by the controller. The drilling work device has one or more second actuator. The method steps include actuating one or more of the first actuator and the second actuator by the controller through predetermined sequential steps to automatically position the machine in a default configuration. The method steps include receiving signals indicative of data corresponding to one or more drilling holes by the controller. The method steps include actuating one or more of the first actuator and the second actuator by the controller based on the received signals indicative of the data corresponding to the drilling hole to automatically position the machine in an operating configuration from the default configuration.

Other features and aspects of this disclosure will be apparent from the following description and the accompanying drawings.

DETAILED DESCRIPTION

Figure 1:
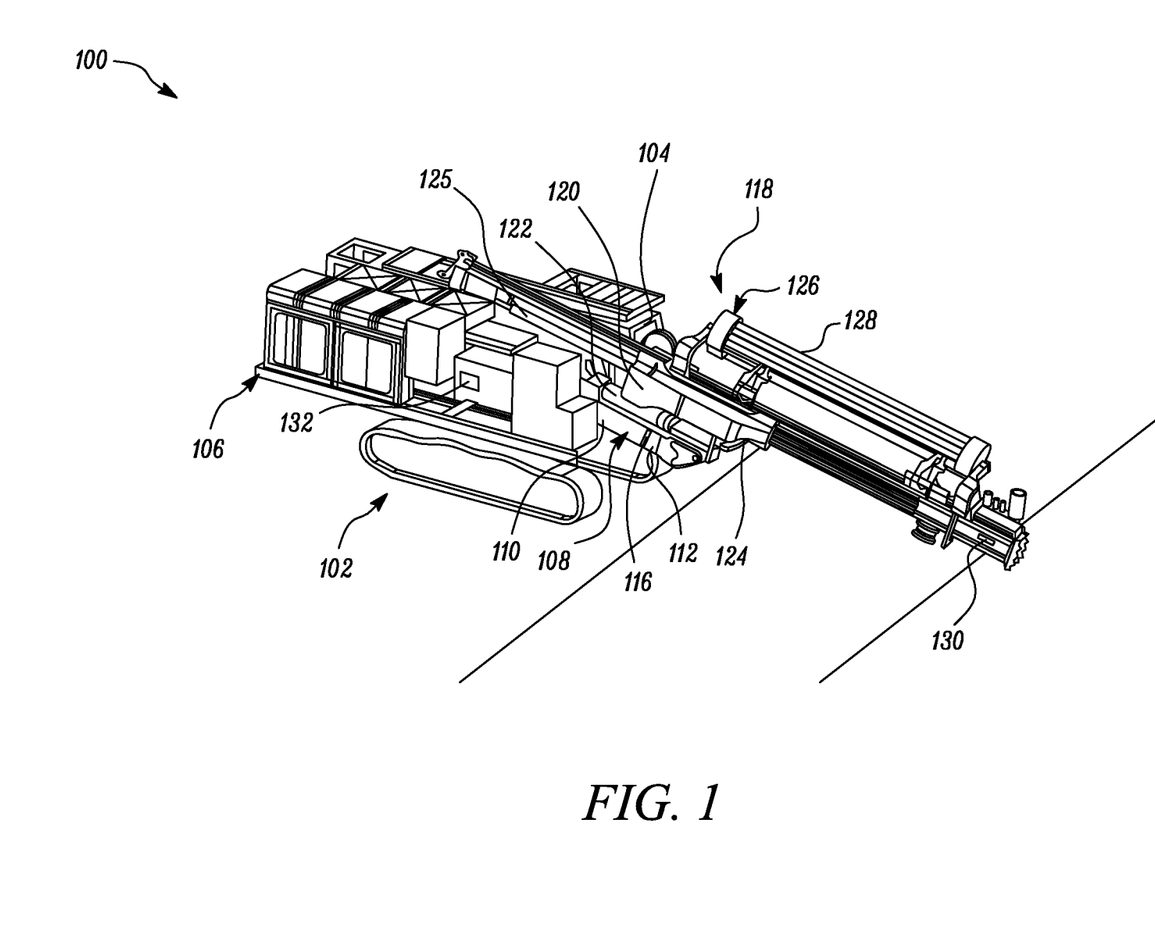
FIG. 1 shows an exemplary machine in a shipping configuration, according to an aspect of the present disclosure.

Wherever possible, the same reference numbers will be used throughout the drawings to refer to same or like parts. FIG. 1 illustrates an exemplary machine 100 with which various aspects of the present disclosure may be applied. Although, the machine 100 is illustrated as a down the hole drill machine, the present disclosure may very well be applied with any other suitable machine type as well.

As illustrated in FIG. 1, the machine 100 includes a movable carrier 102. The movable carrier 102 is illustrated as tracks. However, the movable carrier 102 may also be provided as any other suitable alternative such as wheels as per application requirements. The machine 100 includes an operator cabin 104 coupled on the movable carrier 102. A frame 106 of the machine 100 coupled to the movable carrier 102 supports various components on the frame 106. However, such components are not being discussed in detail in the context of present disclosure. A swing motion of the frame 106 relative to the movable carrier 102 may be locked by a swing lock actuator (not shown). The machine 100 further includes a user input interface (not visible) provided within the operator cabin 104. The user input interface may also be provided at a location outside the operator cabin 104 which is easily accessible to an operator.

The user input interface may be a button, a joystick, a touchscreen, or any other type of an interface which may be suitable for receiving a user input from an operator. The user input may be various operational inputs required for functioning of the machine 100. In an embodiment, the user input may be an indication that the machine 100 needs to be positioned in an operating configuration. In an embodiment, the operating configuration corresponds to a configuration of the machine 100 such that the machine 100 is ready to perform drilling operation at a drilling hole.

The machine 100 includes a boom 108 coupled to the frame 106. The boom 108 has a proximal portion 110 and a distal portion 112. The boom 108 is coupled to the frame 106 at the proximal portion 110 such that the boom 108 is pivoted with the frame 106 at the proximal portion 110. The boom 108 may be moved in a suitable angular range as per application requirements. The machine 100 includes a first actuator 114 which actuates the boom 108. The first actuator 114 includes a boom lift. The boom lift is illustrated as an extendable piston-cylinder arrangement. The first actuator 114 may be actuated by hydraulic means, or pneumatic means or any other such suitable means of actuation.

For various operational purposes in context of the present disclosure, it is vital to understand spatial position of the boom 108. The machine 100 includes one or more first sensor 116 which generates signals indicative of a spatial orientation of the boom 108. The first sensor 116 may be selected from one or more of an inertial measurement unit (IMU), or a proximity sensor. The first sensor 116 may be any suitable type of sensor which may be applicable with various aspects of the present disclosure. The present disclosure is not limited by type of the first sensor 116 in any manner. The first sensor 116 may be attached to the boom 108 at any suitable location between the proximal portion 110 and the distal portion 112.

The machine 100 further includes a drilling work device 118 coupled at the distal portion 112 of the boom 108. The drilling work device 118 includes various components collectively being referred here as the drilling work device 118. In the illustrated embodiment, the drilling work device 118 is used to carry out vertical drilling operation through the various components of the drilling work device 118.

The drilling work device 118 includes a feed table 120 coupled to the distal portion of the boom 108. The machine 100 includes one or more second actuator which may actuate the drilling device 118. The second actuator includes a third actuator 122 and a fourth actuator 125. The third actuator 122 may actuate the drilling device 118 such that the drilling device 118 may be tilted along a first rotational direction R. More specifically, the third actuator 122 actuates the feed table 120 to be tilted along the first rotational direction R. The machine 100 further includes a feed swing actuator 124 as well. The feed swing actuator 124 actuates the drilling work device 118 to control swing of the drilling work device 118.

The feed table 120 supports a drill pipe rack 126 such that the drill pipe rack 126 may slide relative to the feed table 120 as per application requirements. The drill pipe rack 126 supports one or more drill pipes 128 and may be suitable used for supplying, changing or withdrawing the drill pipes 128. The second actuator further includes a fourth actuator 125 for supporting sliding motion of the drill pipe rack 126 relative to the feed table 120. The third actuator 122 and the fourth actuator 125 together may comprise the second actuator and may be used for actuating the drilling work device 118.

The drilling work device 118 may include various other components as well. However, any such components are not limiting to the context of the present disclosure and are not being discussed in detail here. The machine 100 further includes one or more second sensor 130. The second sensor 130 generates signals indicative of a spatial orientation of the drilling work device 118. The drilling work device sensor 130 may include one or more of an inertial measurement unit, a feed table extend sensor, in-cylinder position sensor, a proximity sensor etc. The second sensor 130 may include any other suitable sensor disposed at an appropriate location in the context of the present disclosure.

The machine further includes a controller 132. The controller 132 may include a processor (not shown) and a memory (not shown). The memory may include computer executable instructions that are executable by the processor to perform a logic associated with the controller 132. In an example, the controller 132 may include analog-to-digital converters to process the signals from the various components of the machine 100.

The processor and the memory may be in communication with each other. The processor may be in communication with additional components. The processor may be in communication with the user input interface. In some embodiments, the processor may also receive inputs from the operator via the user input interface. The controller 132 may control various parameters of the machine 100 based on the inputs received from the operator.

The processor may be any device that performs logic operations. The processor may include a general processor, a central processing unit, an application specific integrated circuit (ASIC), a digital signal processor, a field programmable gate array (FPGA), a digital circuit, an analog circuit, a controller, a microcontroller, any other type of processor, or any combination thereof. The processor may include one or more components operable to execute computer executable instructions or computer code embodied in the memory.

Some of the features of the controller 132 may be stored in a computer readable storage medium (for example, as logic implemented as computer executable instructions or as data structures in memory). All or part of the controller 132 and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

A network interface (not shown) may facilitate communication of the controller 132 with a packet-based network, such as a local area network. Additionally, peripheral interfaces (not shown) may be provided. For example, the peripheral interfaces may include RS232 serial interfaces to connect the controller 132 to the other parts of the machine 100 to allow control thereof. The peripheral interfaces may further include Universal Serial Bus (USB) interfaces to facilitate connection of human interface devices to the controller, along with a Video Graphics Array (VGA) interface to allow connection of a display (e.g., the user interface) to the controller 132.

The controller 132 is communicably coupled to the first actuator 114, the first sensor 116, the second actuator and the second sensor 130. The controller 132 is configured to receive signals indicative of the spatial orientation of the boom 108. The controller 132 receives the signals indicative of the spatial orientation of the boom 108 from the first sensor 116. The controller 132 is configured to receive signals indicative of the spatial orientation of the drilling work device 118. The controller 132 receives the signals indicative of the spatial orientation of the drilling work device 118 from the second sensor 130. In an embodiment, the controller 132 is further configured to check the whether the first sensor 116 and the second sensor 130 are calibrated. The controller 132 may calibrate the first sensor 116 and the second sensor 130 based on the check.

FIG. 1 illustrates the machine 100 in a shipping configuration. The shipping configuration may be referred to as a relative positional configuration of various components of the machine 100 such that the machine 100 lies within a shipping envelope and may be placed within a shipping container. The machine 100 may be provided in any other configuration as well to apply concepts of the present disclosure. However, the shipping configuration is being taken as an illustrative example to explain various aspects of the present disclosure. The controller 132 may further receive user input through the user input interface. In an embodiment, the user input is indicative of positioning the machine 100 in the operating configuration.

The controller 132 is further configured to selectively actuate one or more of the first actuator 114 and the second actuator based at least on the received spatial orientation of the boom 108 and the drilling work device 118 and the user input. The controller 132 actuates the first actuator 114 and the second actuator through predetermined sequential steps.

The pre-determined sequential steps may be stored within the memory of the controller 132 or may be accessible to the controller 132 from an off-board location. The pre-determined steps may be defined by taking into account various structural and operational aspects of the machine 100. FIGS. 1 to 6 illustrate various intermediate configurations of the machine 100 achieved through movement of various components to finally arrive at a default configuration. It should be contemplated that the illustrated predetermined sequential steps are exemplary in nature and the present disclosure is not limited to the illustrated exemplary steps only. Various such sequences may be defined based on several parameters related to the machine 100 and initial configuration of the machine 100 and may very well be implemented with several aspects of the present disclosure.

FIG. 1 illustrates the machine 100 such that the machine 100 may be in the shipping configuration. The shipping configuration may be envisioned as a compact relative positioning of various components of the machine 100 which may be suitable for transportation purposes and takes up minimum possible space requirements as well as remains compliant with regulations of the shipping containers and logistics.

Figure 2:
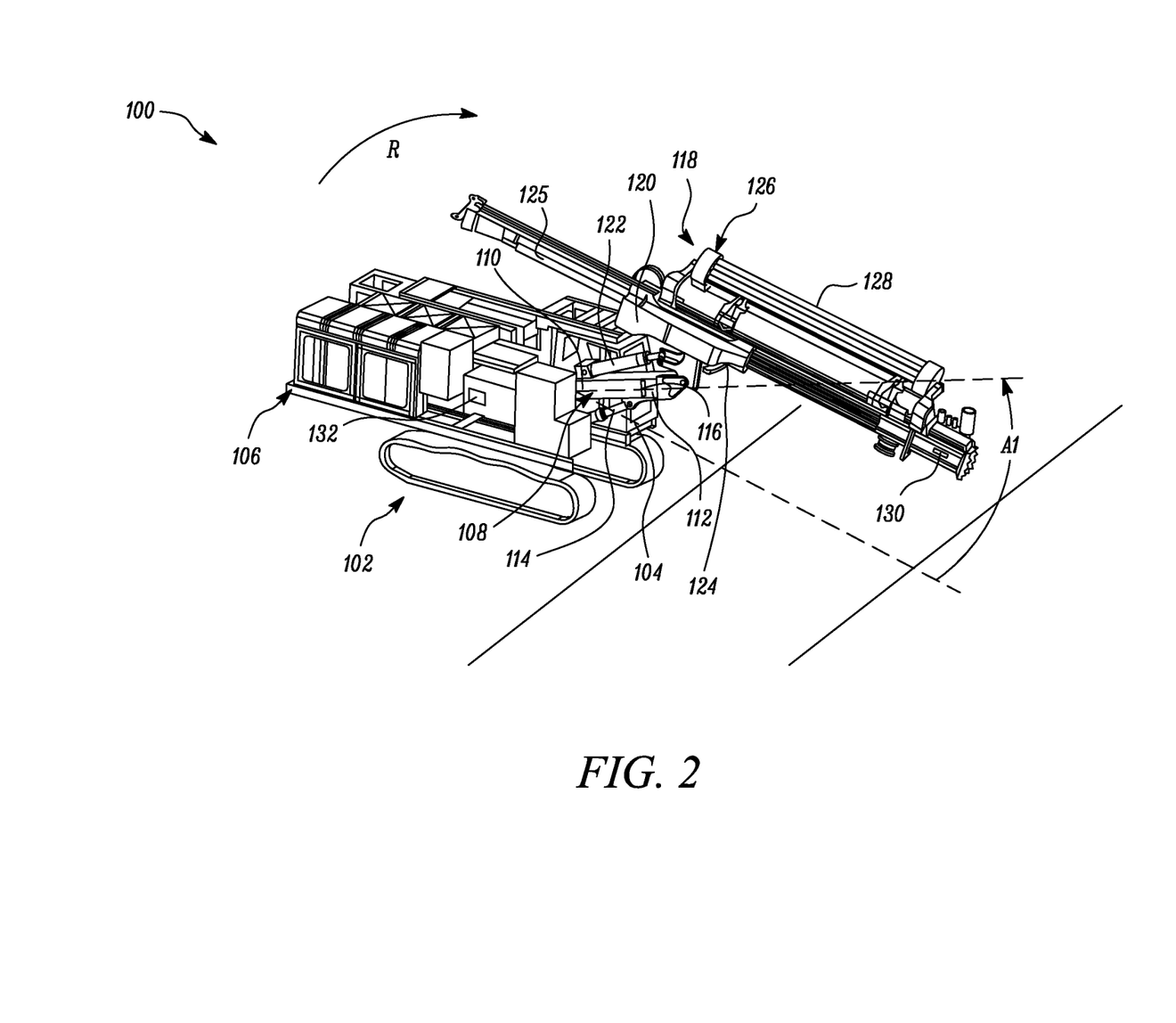
FIGS. 2-6 show the machine in various intermediate configurations, according to an aspect of the present disclosure.

Referring to FIG. 2, when the controller 132 receives the user input that the machine 100 is to be positioned in the operating configuration, the controller 132 starts executing the predetermined sequential steps. The predetermined sequential steps include the controller 132 actuating the first actuator 114 to raise the boom 108. In an embodiment, the boom 108 is raised by a first pre-determined angle $A_1$. The first pre-determined angle $A_1$ may be provided in a range based on various structural aspects of the machine 100, as well as several other relevant parameters. The boom 108 is illustrated as raised by the first pre-determined angle $A_1$ in FIG. 2.

Figure 3:
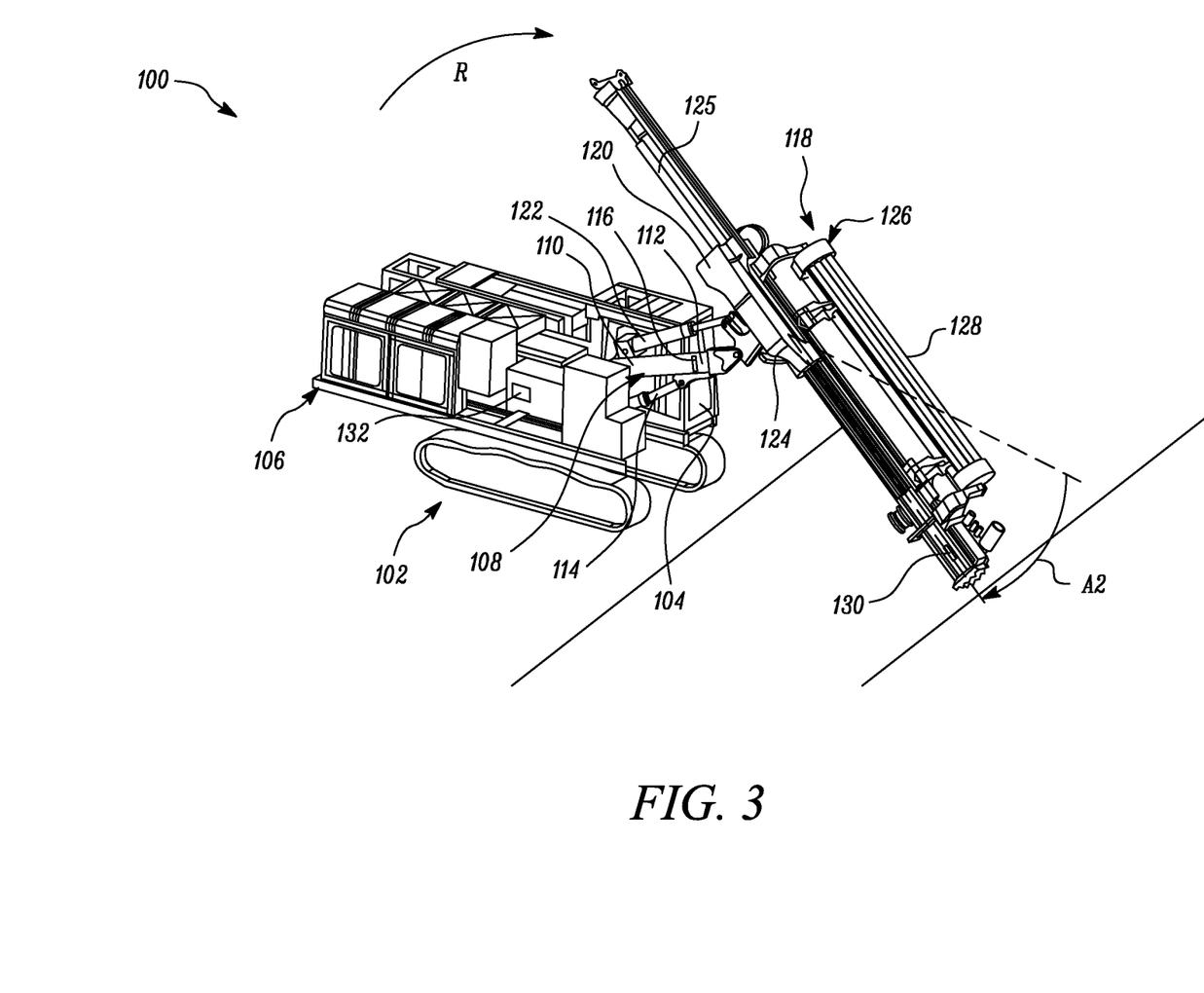

Referring to FIG. 3, the predetermined sequential steps further include the controller 132 actuating the third actuator 122 to tilt the drilling work device 118. The drilling work device 118 is tilted in a first rotational direction R. In an embodiment, the drilling work device 118 is tilted by a second pre-determined angle $A_2$. The second pre-determined angle $A_2$ may be provided in a range based on various structural aspects of the machine 100, as well as several other relevant parameters. The drilling work device 118 is illustrated as tilted by the second pre-determined angle $A_2$ in FIG. 3.

Figure 4:
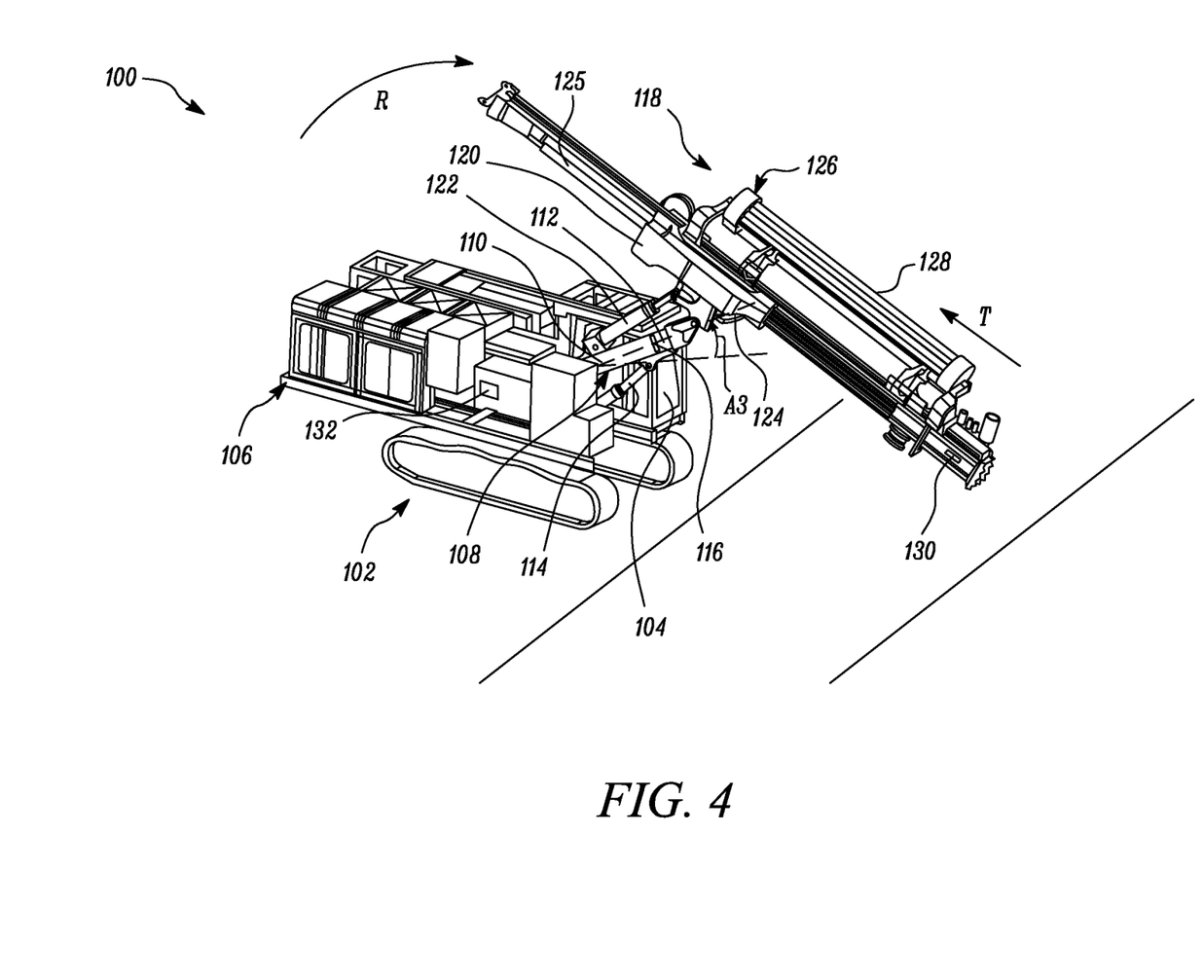

Referring to FIG. 4, the predetermined sequential steps further include the controller 132 actuating the first actuator 114 to further raise the boom 108. In an embodiment, the boom 108 is further raised by a third pre-determined angle $A_3$. The third pre-determined angle $A_3$ may be provided in a range based on various structural aspects of the machine 100, as well as several other relevant parameters. The boom 108 is illustrated as further raised by the third pre-determined angle $A_3$ in FIG. 4.

Figure 5:
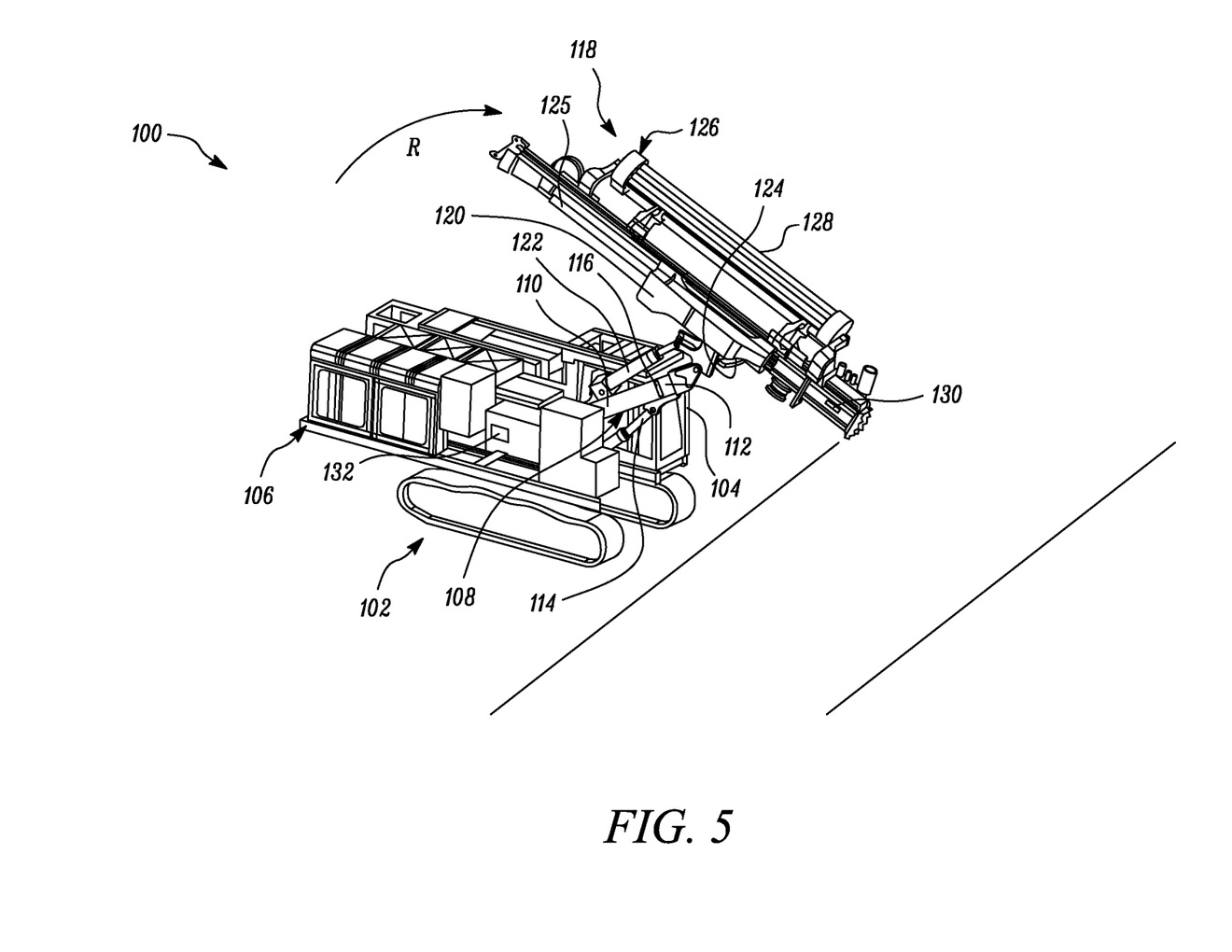

Referring to FIG. 5, the predetermined sequential steps further include the controller 132 actuating the fourth actuator 125 to translate at least a portion of the drilling work device 118 in a first translational direction T. In the illustrated embodiment, the portion of the drilling work device 118 is the drill pipe rack 126 which is translated in the first translational direction T over the feed table 120. The drilling work device 118 is illustrated with the drill pipe rack 126 translated in FIG. 5.

Figure 6:
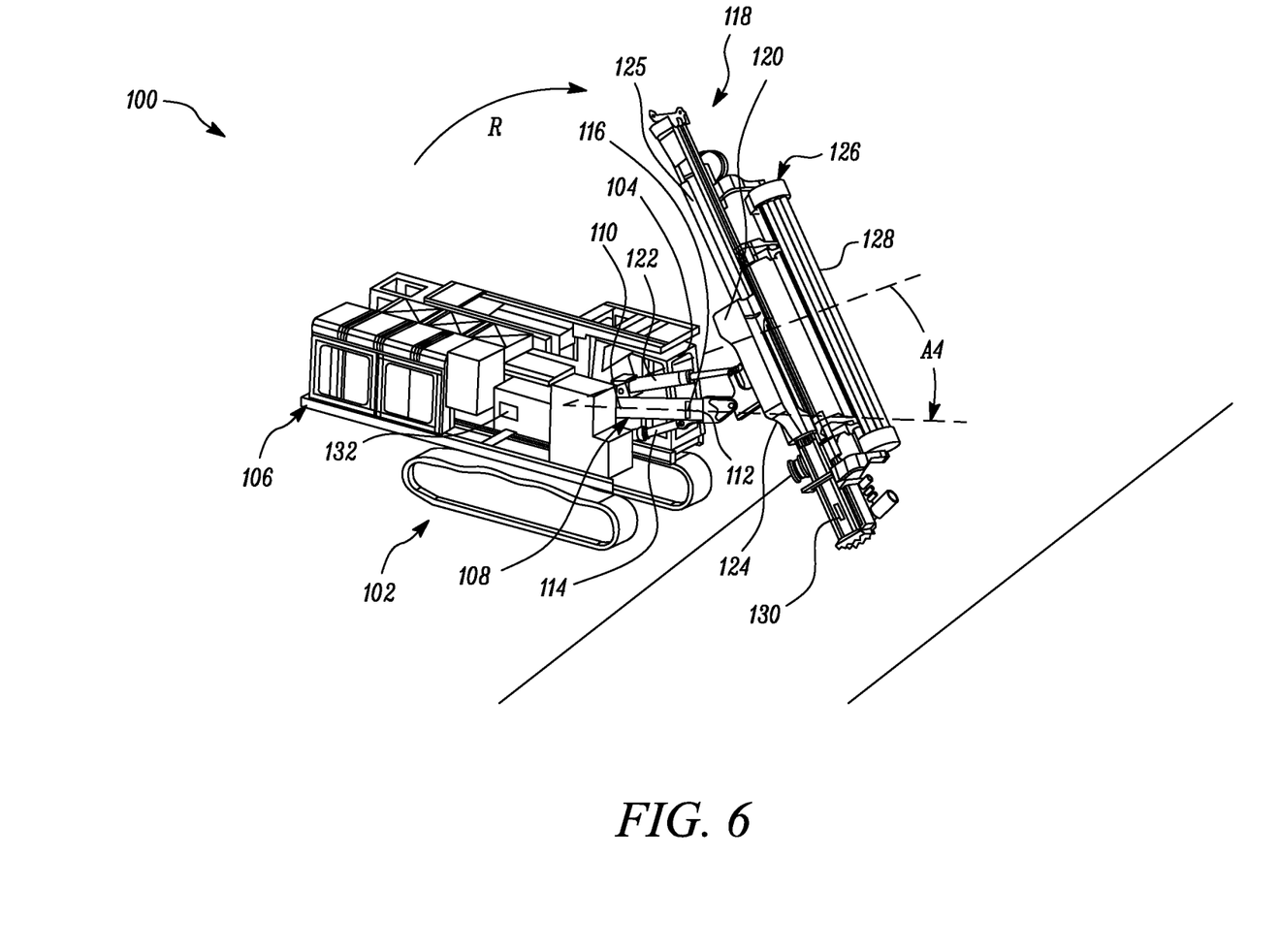

Referring to FIG. 6, the predetermined sequential steps further include the controller 132 actuating the first actuator 114 to lower the boom 108. In an embodiment, the boom 108 is lowered by a fourth pre-determined angle $A_4$. The fourth pre-determined angle $A_4$ may be provided in a range based on various structural aspects of the machine 100, as well as several other relevant parameters. The boom 108 is illustrated as lowered by the fourth pre-determined angle $A_4$ in FIG. 6.

FIG. 6 illustrates the machine 100 in the default configuration. Default configuration may be defined as a precursor step to the operating or drilling configuration. This configuration may be pre-defined such that minimal further adjustments be made to the drilling work device 118 according to drilling location.

The controller 132 is further configured to receive signals indicative of the data corresponding to the at least one drilling hole from the user input interface. The controller 132 actuates one or more of the first actuator 114 and the second actuator based on the received signals indicative of the data corresponding to the at least one drilling hole to automatically position the machine 100 in an operating configuration from the default configuration.

Figure 7:
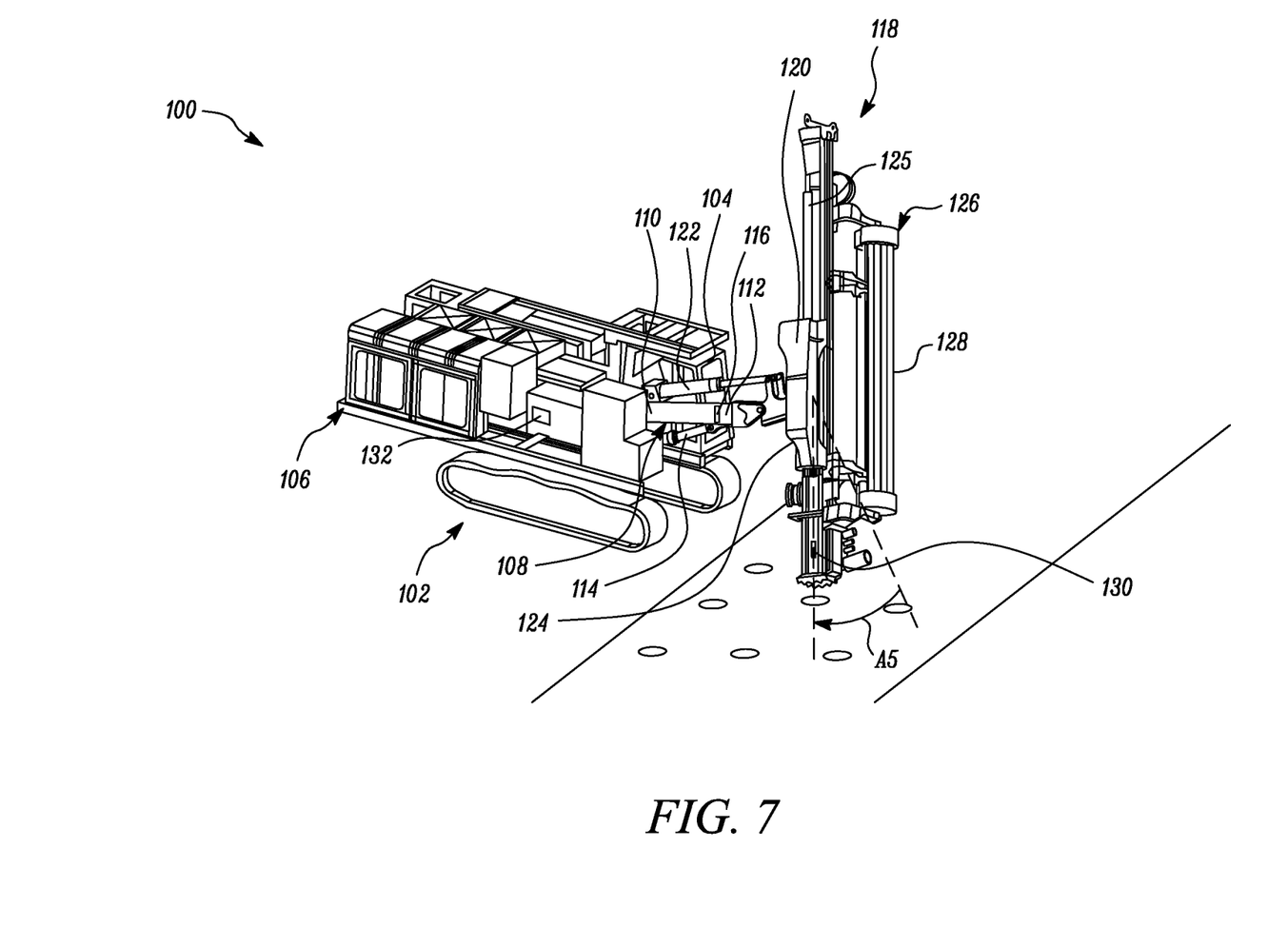
FIG. 7 shows the machine in an operating configuration, according to an aspect of the present disclosure.

FIG. 7 illustrates the operating configuration as the drilling configuration. Once the machine 100 is positioned in the default configuration, the controller 132 may assess the information concerning the drilling location and position the machine 100 accordingly to provide the machine 100 ready for drilling operation. Positioning the machine 100 in the default configuration automates various steps and eliminates manual effort which leads to saving time, effort and operator fatigue leading to increased productivity. Mere a simple push of button allows the operator to position the machine 100 in a desired ready to work configuration.

In an embodiment, the controller 132 is further configured to receive a user input indicative of locking swing motion of the machine 100. Locking the swing motion of the machine 100 refers to locking swing motion of the frame 106 relative to the movable carrier 102. The controller 132 may receive a signal indicative of an angular orientation of the machine 100. The controller 132 may receive such signals from any suitable sensor which may be applicable with various aspects of the present disclosure. The controller 132 adjusts the angular orientation of the machine 100 based on the received signal and actuate the swing lock actuator to lock the swing motion of the frame 106 of the machine 100. In an embodiment, the user input indicative of locking swing motion may be provided automatically after receiving user input indicative of positioning the machine 100 in the operating configuration. Such sequence of steps helps in providing further stability to the machine 100 as drilling operation may exert rotational forces as well to cause the machine 100 to swing inadvertently.

Figure 8:
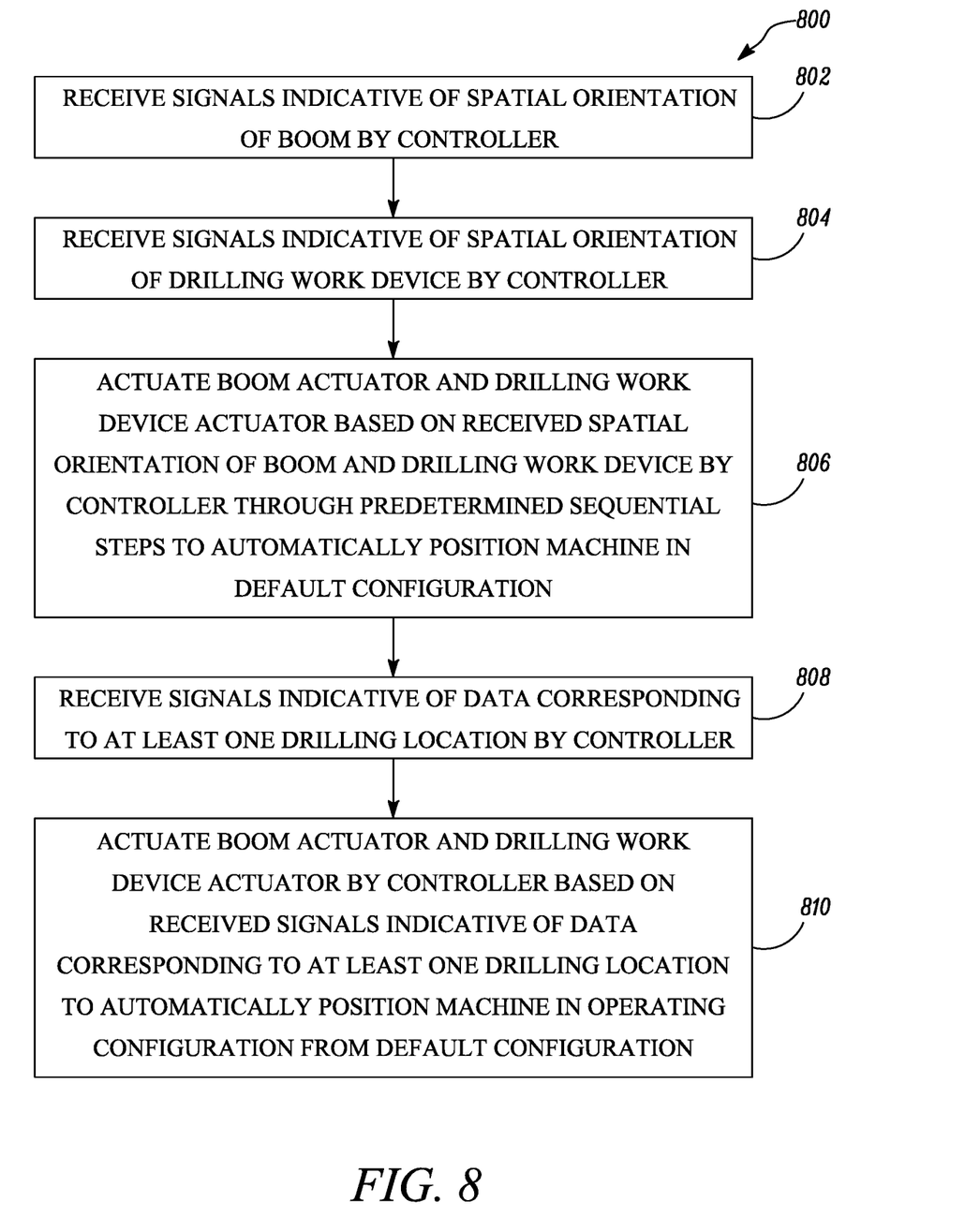
FIG. 8 illustrates method flow chart for controlling the machine, according to an aspect of the present disclosure.

FIG. 8 illustrates a flowchart depicting steps of a method 800 to operate the machine 100. The machine 100 includes the boom 108 and the drilling work device 118 coupled to the boom 108. At step 802, the method 800 includes receiving the signals indicative of the spatial orientation of the boom 108 by the controller 132. The boom 108 has the first actuator 114 for actuating the boom 108. At step 804, the method 800 includes receiving the signals indicative of the spatial orientation of the drilling work device 118 by the controller 132. The drilling work device 118 has the second actuator including the third actuator 122 and the fourth actuator 125. The method 800 may further include checking by the controller 132 whether the first sensor 116 and the second sensor 130 are calibrated. The method 800 may include calibrating the first sensor 116 and the second sensor 130 by the controller 132 based on the check. In an embodiment, the first sensor 116 is selected from one or more of an inertial measurement unit, and a proximity sensor. In another embodiment, the second sensor 130 is selected from one or more of an inertial measurement unit, a feed table extend sensor, and a proximity sensor.

At step 806, the method 800 includes selectively actuating one or more of the first actuator 114 and the second actuator by the controller 132 through predetermined sequential steps to automatically position the machine 100 in the default configuration. In an embodiment, the method 800 includes the controller 132 actuating the first actuator 114, the third actuator 122 and the fourth actuator 125 based on the received spatial orientation of the boom 108 and the drilling work device 118. The method 800 may further include receiving a user input by the controller 132 indicating to position the machine 100 in the default configuration and executing the predetermined sequential steps by the controller 132 based on the user input to position the machine 100 in the default configuration.

At step 808, the method 800 further includes receiving signals indicative of data corresponding to one or more drilling holes from the user input interface by the controller 132. In an embodiment, the data corresponding to the drilling hole includes one or more of a geo-spatial coordinates of the drilling hole, a drilling angle, and dimensions of the drilling hole. The method 800 may include displaying that the machine 100 is ready for operation, if no further adjustments are required. In case further adjustments are required, the method 800 proceeds further. At step 810, the method 800 includes actuating one or more of the first actuator 114 and the second actuator based on the received signals indicative of the data corresponding to the drilling hole to automatically position the machine 100 in an operating configuration from the default configuration by the controller 132. In an embodiment, the operating configuration is the drilling configuration. In an embodiment, the operating configuration corresponds to a configuration of the machine 100 such that the machine 100 is ready to perform drilling operation.

The method 800 further includes receiving the user input indicative of locking swing motion of the machine 100 by the controller 132. The method 800 includes receiving the signal indicative of an angular orientation of the machine 100 by the controller 132. The controller 132 may receive such signals from any suitable sensor which may be applicable with various aspects of the present disclosure. The method 800 includes adjusting the angular orientation of the machine 100 based on the received signal by the controller 132. The method 800 includes actuating the swing lock actuator to lock the swing motion of the frame 106 of the machine 100 relative to the movable carrier 102.

Another aspect of the present disclosure is provided as a computer program. The computer program includes program means configured to control the machine 100. The machine 100 has the boom 108 and the drilling work device 118 coupled to the boom 108. The program means is configured to control the machine 100 to execute method steps including receiving the signals indicative of the spatial orientation of the boom 108 by the controller 132. In an embodiment, the signals indicative of the spatial orientation of the boom 108 are received by the first sensor 116. The boom 108 has the first actuator 114 for actuating the boom 108. The method steps include receiving the signals indicative of the spatial orientation of the drilling work device 118 by the controller 132. In an embodiment, the signals indicative of the spatial orientation of the drilling work device 118 are received by the second sensor 130. The drilling work device 118 has the second actuator including the third actuator 122 and the fourth actuator 125. The method steps include actuating one or more of the first actuator 114 and the second actuator by the controller 132 through predetermined sequential steps to automatically position the machine 100 in the default configuration. In an embodiment, the controller 132 actuates the first actuator 114, the third actuator 122 and the fourth actuator 125 based on the received spatial orientation of the boom 108 and the drilling work device 118.

The method steps further include receiving the signals indicative of data corresponding to the drilling hole by the controller 132. The method steps include actuating one or more of the first actuator 114 and the second actuator by the controller 132 based on the received signals indicative of the data corresponding to the drilling hole to automatically position the machine 100 in the operating configuration from the default configuration.

The computer program is further configured to cause the machine 100 to perform the method step of receiving a user input indicating to position the machine 100 in the default configuration and executing the predetermined sequential steps based on the user input to position the machine 100 in the default configuration.

INDUSTRIAL APPLICABILITY

The present disclosure provides an operator with an option to automate machine set up between different drill holes. For example, when the machine 100 finishes drilling at a drill hole, and requires changeover to another drill hole, the operator needs to enter the subsequent drill hole's information through the user input interface and position the machine 100 near the subsequent drill hole. Afterwards, merely through pushing a button, or using any such user interface, the operator may position the machine 100 in a ready to drill operating configuration. This saves a lot of time, manual effort, operator fatigue and enhances overall productivity. Further, the machine 100 may be set up easily between multiple drilling locations without incurring much downtime in between.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A machine comprising:
a movable carrier;
a frame supported on the movable carrier;
a boom coupled to the frame;
a first actuator adapted to actuate the boom;
at least one first sensor configured to generate signals indicative of a spatial orientation of the boom;
a drilling work device coupled at a distal portion of the boom;
at least one second actuator adapted to actuate the drilling work device;
at least one second sensor configured to generate signals indicative of a spatial orientation of the drilling work device;
a user input interface configured to generate signals indicative of data corresponding to at least one drilling hole; and
a controller communicably coupled to the first actuator, the first sensor, the second actuator and the second sensor, the controller configured to:
receive signals indicative of the spatial orientation of the boom;
receive signals indicative of the spatial orientation of the drilling work device;
actuate selectively the first actuator and the second actuator through predetermined sequential steps to automatically position the machine in a default configuration based on the spatial orientation of the boom and the drilling work device;
receive signals indicative of the data corresponding to the at least one drilling hole; and
actuate at least one of the first actuator and the second actuator based on the received signals indicative of the data corresponding to the at least one drilling hole to automatically position the machine in an operating configuration from the default configuration.

2. The machine of claim 1, wherein the data corresponding to the at least one drilling hole includes one or more of a geo-spatial coordinates of the drilling hole, a drilling angle, and dimensions of the drilling hole.

3. The machine of claim 1, wherein the at least one drilling hole includes an array of holes.

4. The machine of claim 1, wherein the operating configuration corresponds to a configuration of the machine such that the machine is ready to perform drilling operation.

5. The machine of claim 1, wherein the controller is further configured to:
receive a user input indicative of locking swing motion of the machine;
receive a signal indicative of an angular orientation of the machine;
adjust the angular orientation of the machine based on the received signal; and
actuate a swing lock actuator to lock the swing motion of the machine.

6. The machine of claim 1, wherein the at least one first sensor is selected from one or more of an inertial measurement unit, and a proximity sensor.

7. The machine of claim 1, wherein the at least one second sensor is selected from one or more of an inertial measurement unit, a feed table extend sensor, and a proximity sensor.

8. The machine of claim 1, wherein the controller is further configured to:
check whether the at least one first sensor and the at least one second sensor are calibrated; and
calibrate the at least one first sensor and the at least one second sensor based on the check.

9. The machine of claim 1, wherein the user input interface is further configured to provide a user input indicating to position the machine in the default configuration.

10. The machine of claim 9, wherein the controller is further configured to execute the predetermined sequential steps based on the user input to position the machine in the default configuration.

11. The machine of claim 1, wherein the controller selectively actuates at least one of the first actuator and the second actuator based on received spatial orientation of the boom and the drilling work device.

12. A method to operate a machine, the machine having a boom and a drilling work device coupled to the boom, the method comprising:
receiving, by a controller, signals indicative of a spatial orientation of the boom, wherein the boom has a first actuator;
receiving, by the controller, signals indicative of a spatial orientation of the drilling work device, wherein the drilling work device has at least one second actuator;
actuating, by the controller, at least one of the first actuator and the second actuator through predetermined sequential steps to automatically position the machine in a default configuration based on the spatial orientation of the boom and the drilling work device;

receiving, by the controller, signals indicative of data corresponding to at least one drilling hole; and actuating, by the controller, selectively at least one of the first actuator and the second actuator based on the received signals indicative of the data corresponding to the at least one drilling hole to automatically position the machine in an operating configuration from the default configuration.

13. The method of claim 12, further including:

checking, by the controller, whether the first sensor and the second sensor are calibrated; and calibrating, by the controller, the first sensor and the second sensor based on the check.

14. The method of claim 12, further comprising receiving, by the controller, a user input indicating to position the machine in the default configuration; and executing, by the controller, the predetermined sequential steps based on the user input to position the machine in the default configuration.

15. The method of claim 12, further comprising:

receiving, by the controller, a user input indicative of locking swing motion of the machine;

receiving, by the controller, a signal indicative of an angular orientation of the machine;

adjusting, by the controller, the angular orientation of the machine based on the received signal; and actuating, by the controller, a swing lock actuator to lock the swing motion of the machine.

16. The method of claim 12, wherein the operating configuration corresponds to a configuration of the machine such that the machine is ready to perform drilling operation.

17. The method of claim 12, wherein the signals indicative of the spatial orientation of the boom are generated by a first sensor selected from one or more of an inertial measurement unit, and a proximity sensor.

18. The method of claim 12, wherein the signals indicative of a spatial orientation of the drilling work device are generated by a second sensor selected from one or more of an inertial measurement unit, a feed table extend sensor, and a proximity sensor.

19. A computer program comprising:

program code means configured to control a machine having a boom and a drilling work device coupled to the boom to execute method steps of:

receiving, by a controller, signals indicative of a spatial orientation of the boom, wherein the boom has a first actuator;

receiving, by the controller, signals indicative of a spatial orientation of the drilling work device, wherein the drilling work device has at least one second actuator;

actuating, by the controller, at least one of the first actuator and the second actuator through predetermined sequential steps to automatically position the machine in a default configuration based on the spatial orientation of the boom and the drilling work device;

receiving, by the controller, signals indicative of data corresponding to at least one drilling hole; and actuating, by the controller, selectively at least one of the first actuator and the second actuator based on the received signals indicative of the data corresponding to the at least one drilling hole to automatically position the machine in an operating configuration from the default configuration.

20. The computer program of claim 19, wherein the program code means is further configured to cause the machine to perform the method step of:

receiving, by the controller, a user input indicating to position the machine in the default configuration; and executing, by the controller, the predetermined sequential steps based on the user input to position the machine in the default configuration.

\* \* \* \* \*